(12) United States Patent
Tokuda et al.

(10) Patent No.: US 12,276,002 B2
(45) Date of Patent: Apr. 15, 2025

(54) MOLTEN STEEL PRODUCTION METHOD

(71) Applicant: Kobe Steel, Ltd., Kobe (JP)

(72) Inventors: Koji Tokuda, Kobe (JP); Tsuyoshi Mimura, Kobe (JP)

(73) Assignee: Kobe Steel, Ltd., Kobe (JP)

( * ) Notice: Subject to any disclaimer, the term of this patent is extended or adjusted under 35 U.S.C. 154(b) by 368 days.

(21) Appl. No.: 17/777,071

(22) PCT Filed: Dec. 11, 2020

(86) PCT No.: PCT/JP2020/046303
§ 371 (c)(1),
(2) Date: May 16, 2022

(87) PCT Pub. No.: WO2021/131799
PCT Pub. Date: Jul. 1, 2021

(65) Prior Publication Data
US 2022/0396844 A1 Dec. 15, 2022

(30) Foreign Application Priority Data
Dec. 25, 2019 (JP) ................................. 2019-234093

(51) Int. Cl.
*C21C 7/068* (2006.01)
*C21C 5/52* (2006.01)

(52) U.S. Cl.
CPC .............. *C21C 7/068* (2013.01); *C21C 5/527* (2013.01); *C21C 2300/08* (2013.01)

(58) Field of Classification Search
CPC ..... C21C 7/068; C21C 5/527; C21C 2300/08; C21B 13/008
(Continued)

(56) References Cited

U.S. PATENT DOCUMENTS 6,077,324 A   6/2000   Fritz
6,149,709 A   11/2000  Uragami et al.
(Continued)

FOREIGN PATENT DOCUMENTS

CN   107119166 A   9/2017
CN   107299175 A   10/2017
(Continued)

OTHER PUBLICATIONS

WO-2019203278-A1 Translation (Year: 2019).*
(Continued)

*Primary Examiner* — Brian D Walck
*Assistant Examiner* — Danielle Carda
(74) *Attorney, Agent, or Firm* — Oblon, McClelland, Maier & Neustadt, L.L.P.

(57) ABSTRACT

A method for producing a molten steel may provide: solid-state direct reduced iron containing 3.0% by mass or more of $SiO_2$ and $Al_2O_3$ in total and 1.0% by mass or more of carbon, a ratio of a metallic iron to a total iron content contained in the solid-state direct reduced iron being 90% by mass or more, and an excess carbon content Cx to the carbon contained in the solid-state direct reduced iron being 0.2% by mass or more. Such methods may include: a slag separation including heating the solid-state direct reduced iron and melting it in an electric furnace without introducing oxygen to separate into a molten steel and a slag, and continuously discharging the slag, and a decarburization including blowing, in the electric furnace, a total amount of oxygen introduced into the electric furnace to the molten steel to decarburize the molten steel after the slag separation.

7 Claims, 1 Drawing Sheet

(58) Field of Classification Search
USPC .......................................................... 420/129
See application file for complete search history.

(56) References Cited

U.S. PATENT DOCUMENTS

| | | | |
|---|---|---|---|
| 6,241,798 B1 * | 6/2001 | Dimitrov | ............. C21C 5/5252 |
| | | | 75/10.63 |
| 6,424,671 B1 | 7/2002 | Banerjee | |
| 2001/0027701 A1 | 10/2001 | Ito et al. | |
| 2004/0076539 A1 * | 4/2004 | Ito | ........................ C21B 13/105 |
| | | | 420/13 |

FOREIGN PATENT DOCUMENTS

| | | | | |
|---|---|---|---|---|
| CN | 107119166 B | 5/2019 | | |
| JP | 6-212227 A | 8/1994 | | |
| JP | 8-225880 A | 9/1996 | | |
| WO | WO 00/47782 A1 | 8/2000 | | |
| WO | WO-2019203278 A1 * | 10/2019 | ............... | C21C 5/52 |

OTHER PUBLICATIONS

Extended European Search Report issued Nov. 14, 2022 in European Patent Application No. 20907610.8, 8 pages.
International Search Report issued Feb. 9, 2021 in PCT/JP2020/046303 filed on Dec. 11, 2020, 2 pages.
Morales et al., "The Slag Foaming Practice in EAF and Its Influence on the Steel-making Shop Productivity", ISIJ International, The Iron and Steel Institute of Japan, Sep. 1995, vol. 35, No. 9, pp. 1054-1062.

* cited by examiner

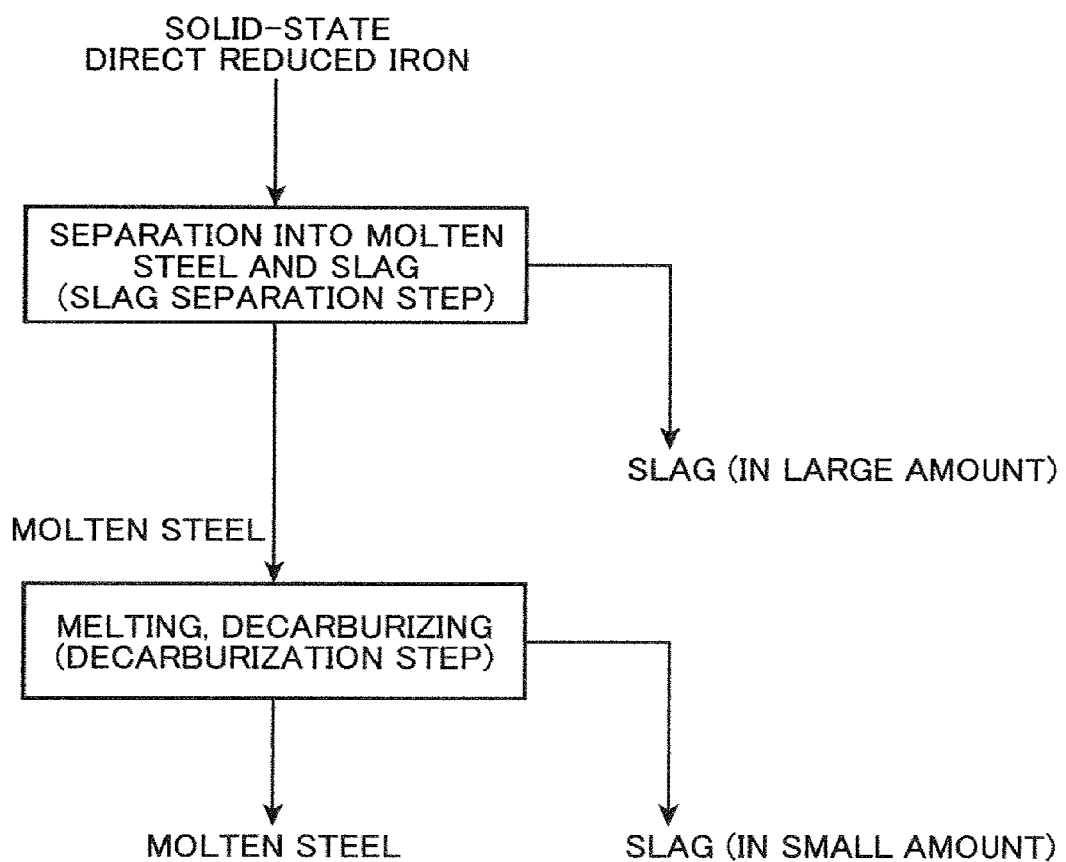

MOLTEN STEEL PRODUCTION METHOD

CROSS-REFERENCE TO RELATED APPLICATIONS

The present application is the national stage of international application PCT/JP2020/046303, filed on Dec. 11, 2020, and claims the benefit of the filing date of Japanese Appl. No. 2019-234093, filed on Dec. 25, 2019.

TECHNICAL FIELD

The present invention relates to a method for producing a molten steel.

BACKGROUND ART

A direct iron production method has been carried out in which an iron oxide source such as iron ore is reduced in a solid state with a carbonaceous material or a reducing gas to obtain a direct reduced iron. Non-Patent Literature 1 discloses a technique in which oxygen is continuously blown during a step of heating and melting a solid-state direct reduced iron in an electric furnace (Electric Arc Furnace; EAF) to separate it into a molten steel and a slag.

In recent years, production amount of so-called high-grade iron ore with a low content of impurities such as gangue has decreased, so importance of a low-grade iron ore as a raw material for steel has been increasing.

However, the solid-state direct reduced iron obtained from a low-grade iron ore as a raw material contains a relatively large amount of gangue, so that when gangue is melted in an electric furnace, a large amount of slag is generated along with a molten steel.

Since the iron content of slag generated together with the molten steel is as high as about 25% by mass, the greater the amount of slag, the more iron contained in the slag, and the yield of the molten steel drops significantly. Therefore, although a low-grade iron ore is cheaper than a high-grade iron ore, the amount of iron ore required to produce a given amount of molten steel is significantly higher in the low-grade iron ore than in the high-grade iron ore. As a result, there is no big merit in terms of cost with respect to the use of the low-grade iron ore.

Furthermore, when a large amount of slag is generated, the amount of electric power required to dissolve a solid-state direct reduced iron and a slag-making material used to adjust the basicity of the slag increase, and the erosion of refractories that make up the furnace body of the electric furnace increase. This also causes a problem that the productivity of the molten steel decreases.

From the above, the use of a low-grade iron ore as a raw material for solid-state direct reduced iron has currently been limited.

The present invention has been made in view of such a problem, and an object thereof is to provide a method for producing a molten steel capable of being obtained in a high yield even when a low-grade iron ore is used as a raw material for solid-state direct reduced iron.

CITATION LIST

Non-Patent Literature

Non-Patent Literature 1: R. D. MORARES, Ruben Lule G., Francisco LOPEZ, Jorge CAMACHO and J. A. ROMERO, "The Slag Foaming Practice in EAF and Its Influence on the Steel-making Shop Productivity", ISIJ International, The Iron and Steel Institute of Japan, September 1995, Vol. 35, No. 9, pp. 1054 to 1062

SUMMARY OF INVENTION

As a result of various studies, the present inventors have found that the above object can be achieved by the following inventions.

A method for producing a molten steel according to one aspect of the present invention is a method for producing a molten steel using a solid-state direct reduced iron as a raw material, wherein:
the solid-state direct reduced iron contains 3.0% by mass or more of $SiO_2$ and $Al_2O_3$ in total and 1.0% by mass or more of carbon,
a ratio of a metallic iron to a total iron content contained in the solid-state direct reduced iron is 90% by mass or more, and
an excess carbon content Cx specified by the following formula (1) to the carbon contained in the solid-state direct reduced iron is 0.2% by mass or more,
the method including:
a slag separation step in which the solid-state direct reduced iron is heated and melted in an electric furnace without introducing oxygen to separate into a molten steel and a slag, and the slag is continuously discharged from the electric furnace, and
a decarburization step of blowing, in the electric furnace, a total amount of oxygen introduced into the electric furnace to the molten steel to decarburize after the slag separation step,
wherein the decarburization step is started when 50% to 80% of a total time for performing the slag separation step and the decarburization step has elapsed from a start of the slag separation step.

$$Cx=[C]-[FeO]\times12\div(55.85+16)\div0.947 \qquad (1)$$

In the formula, Cx: excess carbon content (% by mass), [C]: carbon content of solid-state direct reduced iron (% by mass), [FeO]: FeO content of solid-state direct reduced iron (% by mass).

The object, feature, and advantage of the present invention will be clarified from the following detailed description and attached drawings.

BRIEF DESCRIPTION OF DRAWINGS

FIG. 1 is a flowchart of a method for producing a molten steel according to an embodiment of the present invention.

DESCRIPTION OF EMBODIMENTS

Hereinafter, a method for producing a molten steel according to an embodiment of the present invention will be specifically described, but the present invention is not limited thereto.

[Method for Producing Molten Steel]

A method for producing a molten steel according to the present embodiment is a method for producing a molten steel using a solid-state direct reduced iron as a raw material, wherein the solid-state direct reduced iron contains 3.0% by mass or more of $SiO_2$ and $Al_2O_3$ in total and 1.0% by mass or more of carbon, a ratio of a metallic iron to a total iron content contained in the solid-state direct reduced iron is 90% by mass or more, and an excess carbon content Cx specified by the following formula (1) to the carbon contained in the solid-state direct reduced iron is 0.2% by mass or more.

$$Cx=[C]-[FeO]\times 12\div(55.85+16)\div 0.947 \quad (1)$$

In the formula, Cx: excess carbon content (% by mass), [C]: carbon content of solid-state direct reduced iron (% by mass), [FeO]: FeO content of solid-state direct reduced iron (% by mass).

Further, the method for producing a molten steel according to the present embodiment, as shown in the flowchart of FIG. 1, includes: a slag separation step in which the solid-state direct reduced iron is heated and melted in an electric furnace without introducing oxygen to separate into a molten steel and a slag, and the slag is continuously discharged from the electric furnace, and a decarburization step of blowing, in the electric furnace, the total amount of oxygen introduced into the electric furnace to the molten steel to decarburize after the slag separation step. The decarburization step is started when 50% to 80% of the total time for performing the slag separation step and the decarburization step has elapsed from the start of the slag separation step.

According to the above constitution, it is possible to provide a method for producing a molten steel with a high yield even if a low-grade iron ore is used as a raw material for a solid-state direct reduced iron.

In the following, each requirement of the method for producing a molten steel according to the present embodiment will be described.

(Solid-State Direct Reduced Iron)

In the method for producing a molten steel according to the present embodiment, a solid-state direct reduced iron having a total content of $SiO_2$ and $Al_2O_3$ of 3.0% by mass or more is used. As the solid-state direct reduced iron, for example, iron oxide sources such as iron ore, which are reduced in a solid state with a carbonaceous material or a reducing gas, can be used. The method for producing a solid-state direct reduced iron is not particularly limited. For example, production methods using known solid-state direct reduced iron production plants such as rotary hearth furnaces, movable hearth type reduction furnaces such as straight grate, vertical furnaces such as shaft furnaces, and rotary furnaces such as rotary kilns can be applied.

When the total content of $SiO_2$ and $Al_2O_3$ of the solid-state direct reduced iron is less than 3.0% by mass, the grade of the iron oxide source such as iron ore used for producing the solid-state direct reduced iron is high. Since such solid-state direct reduced iron produces a small amount of slag as a by-product, molten steel can be obtained with a high yield even if slag separation and decarburization are performed simultaneously in an electric furnace. As a result, when the total content of $SiO_2$ and $Al_2O_3$ of the solid-state direct reduced iron is less than 3.0% by mass, it is not necessary to apply the method for producing a molten steel according to the present embodiment in which the slag is separated prior to decarburization. Therefore, in the method for producing a molten steel according to the present embodiment, a solid-state direct reduced iron having a total content of $SiO_2$ and $Al_2O_3$ of 3.0% by mass or more is used.

The carbon content of the solid-state direct reduced iron is set to 1.0% by mass or more. When the solid-state direct reduced iron is melted in an electric furnace, FeO in the solid-state direct reduced iron is reduced by the carbon contained in the solid-state direct reduced iron, thereby to generate CO gas. By setting the carbon content of the solid-state direct reduced iron to 1.0% by mass or more, a sufficient volume of CO gas can be generated, and thus a sufficient slag foaming can be achieved by the generated CO gas. Efficient heating becomes possible by performing an arc heating in this foamed slag. From this viewpoint, the carbon content of the solid-state direct reduced iron is preferably 1.5% by mass or more.

On the other hand, if the carbon content of the solid-state direct reduced iron is excessive, the amount of oxygen introduced into the electric furnace in the decarburization step increases, and the amount of FeO eluted in the slag increases as the amount of oxygen increases. Therefore, the carbon content of the solid-state direct reduced iron is preferably 3.0% by mass or less.

A ratio of a metallic iron to a total iron content contained in the solid-state direct reduced iron (hereinafter, also referred to as "metallization rate of solid-state direct reduced iron" or simply "metallization rate") is set to 90% by mass or more. By setting the metallization rate of the solid-state direct reduced iron to 90% by mass or more, a molten steel can be produced with a high yield by the method for producing a molten steel according to the present embodiment.

When the metallization rate of the solid-state direct reduced iron is less than 90% by mass, the FeO content in the solid-state direct reduced iron increases. The carbon content of the solid-state direct reduced iron can be increased in a carburizing process performed during the production of the solid-state direct reduced iron. However, there is an upper limit to the carbon content of the solid-state direct reduced iron that is industrially feasible. Therefore, when the content of FeO in the solid-state direct reduced iron is high, FeO that is not reduced by the carbon contained in the solid-state direct reduced iron remains much in the slag separation step and the decarburization step. Most of the unreduced FeO elutes into a slag as it is and is discharged from the electric furnace together with the slag. As described above, when the metallization rate of the solid-state direct reduced iron is less than 90% by mass, it is difficult to produce a molten steel with a high yield even if the slag separation step and the decarburization step according to the present embodiment are applied. Therefore, in the method for producing a molten steel according to the present embodiment, the metallization rate of the solid-state direct reduced iron is set to 90% by mass or more. Further, when the FeO content in the solid-state direct reduced iron is high, the energy required for reducing FeO in the slag separation step increases. Therefore, the metallization rate of the solid-state direct reduced iron is more preferably 92% by mass or more. The higher the metallization rate is, the more preferred it is, so there is no specific upper limit thereon. However, since an excessively high metallization rate greatly reduces the productivity of the solid-state direct reduced iron in a production process for solid-state direct reduced iron, the metallization rate is preferably 98% by mass or less, more preferably 97% by mass or less.

Of the carbon contained in the solid-state direct reduced iron, the excess carbon content Cx specified by the above formula (1) is set to 0.2% by mass or more. The excess carbon content Cx is an amount of carbon remaining (excess carbon) when all FeO contained in the solid-state direct reduced iron is reduced with the carbon contained in the solid-state direct reduced iron. By setting the excess carbon content Cx to 0.2% by mass or more, when the solid-state direct reduced iron is melted in the electric furnace, all FeO contained in the solid-state direct reduced iron is reduced by the carbon contained in the solid-state direct reduced iron. Therefore, the elution of FeO contained in the solid-state direct reduced iron into the slag can be suppressed.

The excess carbon is necessary to suppress the elution of FeO contained in the solid-state direct reduced iron into the slag. The excess carbon content Cx is set to 0.2% by mass or more so that the elution of FeO into the slag is surely suppressed. If the excess carbon content Cx is excessive, the amount of oxygen introduced into the electric furnace in the decarburization step increases, and the amount of FeO eluted in the slag increases as the amount of oxygen increases. Therefore, the excess carbon content Cx is preferably 2.0% by mass or less.

Next, each step of the method for producing a molten steel according to the present embodiment will be described.

(Slag Separation Step)

In the slag separation step, a solid-state direct reduced iron is heated and melted in an electric furnace without introducing oxygen, separated into a molten steel and a slag, and then the slag is continuously discharged from the electric furnace. It is possible to use, as the electric furnace, a general steelmaking electric furnace (Electric Arc Furnace; EAF) that generates an arc plasma to perform the heating.

The solid-state direct reduced iron is put into an electric furnace and heated to separate it into a molten steel and a slag. The solid-state direct reduced iron to be put into the electric furnace is preferably in a state after production and before the temperature drops to reduce the energy required for heating. The electric furnace before charging the solid-state direct reduced iron may be empty, but in order to enable continuous melting of the solid-state direct reduced iron immediately in the next heat (the next molten steel production performed after the previous molten steel production is completed), it is preferable that the molten steel and the slag are housed in a state of so-called hot heel or remaining molten metal.

In the slag separation step, the solid-state direct reduced iron is heated and melted without introducing oxygen into the electric furnace. This is based on the findings obtained from the studies by the present inventors that the amount of FeO contained in the generated slag can be reduced by melting the solid-state direct reduced iron without introducing oxygen into the electric furnace as compared with the case where oxygen is introduced. When oxygen is introduced into the electric furnace, the oxygen reacts with carbon contained in the solid-state direct reduced iron to generate carbon monoxide gas. As a result, FeO contained in the solid-state direct reduced iron is not reduced and is eluted as it is into the slag. In addition, a part of metallic iron (Fe) contained in the solid-state direct reduced iron or a part of metallic iron (Fe) in the molten steel is also oxidized by oxygen to become FeO, and this FeO also elutes into the slag, so that the content of FeO contained in the slag will increase. On the other hand, if oxygen is not introduced into the electric furnace, FeO contained in the solid-state direct reduced iron is reduced by the excess carbon contained in the solid-state direct reduced iron, thereby to be able to suppress the elution of FeO into the slag. As a result, the iron content discharged together with the slag can be reduced, and the decrease in the yield of the molten steel can be suppressed.

In the slag separation step of the present embodiment, "introduction of oxygen" means artificial introduction of oxygen such as blowing oxygen or air onto molten steel. However, the introduction of oxygen does not include the unavoidable secondary inflow of air into the furnace due to, for example, intake and ventilation for dust treatment in the electric furnace.

In the present embodiment, the decarburization step is started when 50% to 80% of the total time for performing the slag separation step and the decarburization step has elapsed from the start of the slag separation step. That is, the time for performing the slag separation step is 50% to 80% of the total time for performing the slag separation step and the decarburization step. The time for performing the slag separation step will be described later together with the explanation as to the time for performing the decarburization step.

In the slag separation step, the temperature of the molten steel is preferably set to 1500 to 1650° C. By setting the temperature of the molten steel to 1500° C. or higher, the viscosity of the slag is lowered, so that the molten steel and the slag can be easily separated and each of the molten steel and the slag can be easily discharged from the electric furnace. On the other hand, by setting the temperature of the molten steel to 1650° C. or lower, it is possible to suppress the erosion of the refractory lining of the electric furnace. The temperature of the molten steel is more preferably 1530° C. or higher, and more preferably 1630° C. or lower.

The basicity of the slag is preferably set to 1.4 to 2.0. The basicity of the slag can be adjusted by appropriately adding a slag-making material such as quicklime or dolomite to the solid-state direct reduced iron, followed by melting in an electric furnace according to the total content of $SiO_2$ and $Al_2O_3$ of the solid-state direct reduced iron. By setting the basicity of the slag to 2.0 or less, the fluidity of the slag is easily ensured, and the slag can be easily discharged from the electric furnace. Further, when a basic refractory is used as a refractory lining of the electric furnace, the erosion of the refractory due to the slag can be suppressed by setting the basicity of the slag to 1.4 or more. Here, the basicity of the slag means a mass ratio of CaO to $SiO_2$ ($CaO/SiO_2$) with respect to CaO and $SiO_2$ contained in the slag. The basicity of the slag can be adjusted by adjusting the amount of a slag-making material to be charged into the electric furnace together with the solid-state direct reduced iron.

In the slag separation step, the solid-state direct reduced iron and the slag-making material are put into the electric furnace, heating is started, and after confirming that the slag-making material is completely melted in the furnace, opening of the slag door of the electric furnace is adjusted to discharge the slag. In order to keep the basicity of the slag as constant as possible, it is preferable to continuously add the solid-state direct reduced iron and the slag-making material sequentially from the start to the end of the slag separation step while heating in the electric furnace, and it is more preferable to continuously add the solid-state direct reduced iron and the slag-making material in sequence over the decarburization step.

(Decarburization Step)

In the decarburization step, after the slag separation step, oxygen is blown onto the molten steel in the electric furnace to reduce the carbon content of the molten steel to a predetermined target value. The decarburization step starts when 50% to 80% of the total time for performing the slag separation step and the decarburization step has elapsed from the start of the slag separation step, and the total amount of oxygen to be introduced into the electric furnace is introduced in the decarburization step.

The contents in the electric furnace in the decarburization step include a molten steel produced in the slag separation step and a slag remaining without being removed in the slag separation step. Even in the decarburization step, when the solid-state direct reduced iron is continuously charged into the electric furnace, the solid-state direct reduced iron is also included in the contents. In the decarburization step, oxygen is blown from the upper surface or the lower surface of the molten steel and slag in this electric furnace to oxidize the carbon contained in the molten steel and remove the carbon as carbon monoxide, thereby to reduce the carbon content of the molten steel. Further, also in the decarburization step, a slag-making material such as quicklime or dolomite may be appropriately added to the molten material as needed based on the composition of the molten steel and the like. By adjusting the composition of the slag with the slag-making material, impurities contained in the molten steel may be transferred to the slag, and the impurity content of the molten steel may be adjusted to a desired value.

The decarburization step starts when 50% to 80% of the total time for performing the slag separation step and the decarburization step has elapsed from the start of the slag separation step. That is, the time for performing the decarburization step is 20% to 50% of the total time for performing the slag separation step and the decarburization step.

The time for performing the slag separation step and the time for performing the decarburization step can be determined, for example, according to the total content of $SiO_2$ and $Al_2O_3$ contained in the solid-state direct reduced iron. The larger the total content of $SiO_2$ and $Al_2O_3$ contained in the solid-state direct reduced iron, the longer the time for performing the slag separation step is preferable. This is because the longer the time for performing the slag separation step is, the more slag can be generated and discharged in the slag separation step. In the decarburization step, the amount of iron eluted in the slag increases due to the introduction of oxygen into the electric furnace as compared with the slag separation step. However, by generating more slag in the slag separation step, the total amount of the slag generated in the decarburization step can be reduced and the iron content discharged with the slag can be reduced, thereby to be able to increase the yield of the molten steel.

Therefore, in the present embodiment, the time for performing the slag separation step is set to 50% or more of the total time for performing the slag separation step and the decarburization step. That is, the start time of the decarburization step is defined as the time when 50% or more of the total time for performing the slag separation step and the decarburization step has elapsed from the start of the slag separation step. The start time of the decarburization step is preferably the time when 60% or more of the total time for performing the slag separation step and the decarburization step has elapsed from the start of the slag separation step.

On the other hand, as a method of increasing the ratio of the time for performing the slag separation step to the total time for performing the slag separation step and the decarburization step, there is a method of increasing the rate of introducing oxygen into the electric furnace, that is, there is a method of shortening the time for performing the decarburization step by increasing the introduction amount of the oxygen per unit time. However, this method requires modification of the equipment to improve the capacity of an oxygen blowing device and an exhaust gas treatment equipment, resulting in an increase in the cost of molten steel production. Accordingly, it is necessary to secure a certain amount of time for the decarburization step.

Therefore, in the present embodiment, the time for performing the slag separation step is set to 80% or less of the total time for performing the slag separation step and the decarburization step. That is, the start time of the decarburization step is defined as the time when 80% or less of the total time for performing the slag separation step and the decarburization step has elapsed from the start of the slag separation step. The start time of the decarburization step is preferably the time when 75% or less of the total time for performing the slag separation step and the decarburization step has elapsed from the start of the slag separation step.

The total time for performing the slag separation step and the decarburization step can be determined according to the capacity of the electric furnace, and can be, for example, 40 to 80 minutes. As the specific time for the slag separation step and the decarburization step, for example, the time of the slag separation step can be 32 minutes, the time of the decarburization step can be 10 minutes, and the total time can be 42 minutes, in the case where the amount of remaining molten metal in the electric furnace is 48 tons, the amount of the solid-state direct reduced iron supplied is 4.7 tons per minute, and the amount of steelmaking is 160 tons, using an electric furnace having a capacity of 208 tons.

In the decarburization step, the total amount of oxygen to be introduced into the electric furnace is introduced. The amount of oxygen introduced into the electric furnace is an amount of oxygen required to reduce the carbon contained in the molten steel to decarburize and set the amount of carbon contained in the molten steel after decarburization to a predetermined value. The predetermined carbon content contained in the molten steel shall be, for example, equal to or greater than the target carbon content of the casting material prepared by pouring the molten steel into a mold, and not more than or equal to the value obtained by adding 0.1% by mass to the target carbon content. The target carbon content of the casting material can be set to an arbitrary value according to the application of the casting material.

In the decarburization step, the temperature of the molten steel is preferably 1500 to 1650° C. By setting the temperature of the molten steel to 1500° C. or higher, the solid-state direct reduced iron continuously charged into the electric furnace can be surely melted, and the viscosity of the slag is lowered, so that the molten steel and the slag can be easily discharged from the electric furnace without leaving an unmelted residue. The temperature of the molten steel is more preferably 1530° C. or higher. Further, when the temperature of the molten steel exceeds 1650° C., the erosion of the refractory lining of the electric furnace increases, and the amount of electric power used per ton of the molten steel also increases. The temperature of the molten steel is more preferably 1630° C. or lower.

The basicity of the slag in the decarburization step is not particularly limited, but when a basic refractory is used as the refractory lining of the electric furnace, the basicity of the slag is preferably 1.4 to 2.0 as in the slag separation step, so that the erosion of the refractory due to the slag is suppressed.

According to the method for producing a molten steel according to the present embodiment, as described above, a decrease in the yield of the molten steel can be suppressed in the slag separation step, and a molten steel having a predetermined carbon content can be obtained in the decarburization step. Since these steps can be performed in one electric furnace, the molten steel can be efficiently obtained in a high yield even if a low-grade iron ore is used as a raw material for solid-state direct reduced iron.

The present specification discloses various aspects of techniques as described above, and the main techniques are summarized below.

As described above, the method for producing a molten steel according to one aspect of the present invention is a method for producing a molten steel using a solid-state direct reduced iron as a raw material, wherein:

the solid-state direct reduced iron contains 3.0% by mass or more of $SiO_2$ and $Al_2O_3$ in total and 1.0% by mass or more of carbon, a ratio of a metallic iron to a total iron content contained in the solid-state direct reduced iron is 90% by mass or more, and an excess carbon content Cx specified by the following formula (1) to the carbon contained in the solid-state direct reduced iron is 0.2% by mass or more, the method including:

a slag separation step in which the solid-state direct reduced iron is heated and melted in an electric furnace without introducing oxygen to separate into a molten steel and a slag, and the slag is continuously discharged from the electric furnace, and a decarburization step of blowing, in the electric furnace, a total amount of oxygen introduced into the electric furnace to the molten steel to decarburize the molten steel after the slag separation step, wherein the decarburization step is started when 50% to 80% of a total time for performing the slag separation step and the decarburization step has elapsed from a start of the slag separation step.

$$Cx=[C]-[FeO]\times 12\div(55.85+16)\div 0.947 \quad (1)$$

In the formula, Cx: excess carbon content (% by mass), [C]: carbon content of solid-state direct reduced iron (% by mass), [FeO]: FeO content of solid-state direct reduced iron (% by mass).

According to this constitution, FeO contained in the solid-state direct reduced iron is reduced by the excess carbon contained in the solid-state direct reduced iron in the slag separation step, so that elution of FeO into the slag can be suppressed. Therefore, it is possible to suppress a decrease in the yield of the molten steel in the slag separation step. In the decarburization step, the amount of iron transferred to the slag increases due to the introduction of oxygen into the electric furnace as compared with the slag separation step. However, by generating slag in the slag separation step, the total amount of slag generated in the decarburization step is reduced, so that FeO discharged together with the slag in the decarburization step is suppressed. Further, in the decarburization step, the carbon content of the molten steel can be reduced to be able to obtain a molten steel having a predetermined carbon content. As described above, according to the method for producing a molten steel having the above constitution, the molten steel can be obtained in a high yield through the above two steps even if a low-grade iron ore is used as a raw material for solid-state direct reduced iron.

In the slag separation step having the above constitution, the basicity of the slag may be 1.4 to 2.0, and in the decarburization step, the temperature of the molten steel may be 1500 to 1650° C.

As a result, slag having a low FeO content can be easily discharged from the electric furnace in the slag separation step, so that molten steel can be efficiently produced.

Hereinafter, the present invention will be described more specifically with reference to Examples. The following examples are not construed to limit the scope of the invention, and the present invention can be implemented with modifications being added within a scope adaptable to the purposes described above and below, and any of them is to be included within the technical range of the present invention.

Examples (Test Conditions)

Using solid-state direct reduced irons each having the composition shown in Table 1 as a raw material, computer simulation was performed regarding the production of molten steels of the following test numbers 1 to 3 in a steelmaking electric furnace (EAF) described above. Solid-state Direct reduced iron A1 was produced from a low-grade iron ore as a raw material and had a total content of $SiO_2$ and $Al_2O_3$ of 7.63% by mass. Solid-state Direct reduced iron A2 was produced from a high-grade iron ore as a raw material and had a total content of $SiO_2$ and $Al_2O_3$ of 2.47% by mass. The metallization rate was 94.0% in each case. "T.Fe" shown in Table 1 means a total iron content contained in the solid-state direct reduced iron.

TABLE 1

| Solid-state Direct reduced iron | Component composition (% by mass) | | | | | | $SiO_2$ + $Al_2O_3$ | Metallization rate (%) |
| --- | --- | --- | --- | --- | --- | --- | --- | --- |
| | T.Fe | $SiO_2$ | $Al_2O_3$ | CaO | MgO | C | | |
| A1 | 88.3 | 7.63 | 0.00 | 0.47 | 0.51 | 1.5 | 7.63 | 94.0 |
| A2 | 93.1 | 1.72 | 0.75 | 0.89 | 0.34 | 1.5 | 2.47 | 94.0 |

(Test 1)

Test 1 is an example of the present invention. In Test 1, the test was carried out using the solid-state direct reduced iron A1. The decarburization step was started when 75% of the total time for performing the slag separation step and the decarburization step had elapsed from the start of the slag separation step. That is, the time for the slag separation step was set to 75% of the total time for performing the slag separation step and the decarburization step, and the time for the decarburization step was set to 25% of the total time. Oxygen was not introduced in the slag separation step, but oxygen was introduced only in the decarburization step. In the decarburization step, a total of 10.2 Nm³/t of oxygen was introduced at a constant flow rate.

A solid-state direct reduced iron at 500° C. was put into a steelmaking electric furnace, and in the slag separation step, oxygen was not used, and the slag was continuously discharged from the steelmaking electric furnace by opening a vertically movable slag door installed on the slag exhaust side of the steelmaking electric furnace. In the decarburization step, oxygen was blown into the molten steel so that the carbon content of the molten steel was adjusted to 0.15% by mass and the temperature of the molten steel was set to 1630° C.

In the slag separation step and the decarburization step, quicklime and dolomite were used as slag-making materials, and the basicity of the slag was set to 1.8 as shown in Table 2.

(Test 2 and Test 3)

Test 2 is a comparative example using a solid-state direct reduced iron A1, and Test 3 is a reference example using a solid-state direct reduced iron A2. In both Test 2 and Test 3, a constant flow rate of oxygen was supplied from the start of heating of the steelmaking electric furnace to the end of decarburization. In both Test 2 and Test 3, a solid-state direct reduced iron at 500° C. was charged into a steelmaking electric furnace, and the carbon content of the molten steel was set to 0.15% by mass, and the temperature of the molten steel was set to 1630° C. In addition, quicklime and dolomite were used as the slag-making materials, and the basicity of the slag was set to 1.8 as shown in Table 2.

TABLE 2

| Electric furnace | Test 1 | Test 2 | Test 3 |
|---|---|---|---|
| Basicity of Slag | 1.8 | 1.8 | 1.8 |
| MgO content of slag (% by mass) | 12 | 12 | 12 |
| FeO content of slag (% by mass) | 10.0 | 25.0 | 25.0 |
| Carbon content of molten steel (% by mass) | 0.15 | 0.15 | 0.15 |
| Temperature of molten steel (° C.) | 1630 | 1630 | 1630 |
| Amount of direct reduced iron (500° C.) used (kg/t) | 1161 | 1231 | 1095 |
| Amount of quicklime used (kg/t) | 162 | 149 | 19 |
| Amount of dolomite used (kg/t) | 44 | 87 | 18 |
| Amount of electric power used (kWh/t) | 588 | 542 | 461 |
| Amount of carbon used (kg/t) | 0 | 0 | 0 |
| Amount of oxygen used (Nm$^3$/t) | 10.2 | 23.2 | 7.6 |
| Amount of slag produced (kg/t) | 338 | 456 | 104 |
| Yield of molten steel (%) | 96.8 | 91.9 | 98.0 |

(Test Results)

Table 2 showed the amount of raw materials and electric power used for the production per ton of molten steel, the amount of slag produced, and the yield of the molten steel. Here, the yield of the molten steel is the ratio (% by mass) of the iron content recovered as the molten steel to the iron content charged into the steelmaking electric furnace as the solid-state direct reduced iron.

(Test 1)

In Test 1, since oxygen was not introduced into the steelmaking electric furnace in the slag separation step, the average FeO content of the slag discharged in the slag separation step was 5% by mass. In the decarburization step, by introducing oxygen, FeO contained in the solid-state direct reduced iron elutes into the slag as it is, and the newly generated FeO produced by oxidizing a metallic iron with oxygen elutes into the slag, so that the average FeO content of the slag in the decarburization step was 25.0% by mass. The average FeO content of the entire slag combined from the slag separation step and the decarburization step was 10% by mass. As described above, since the FeO content was relatively small at 10% by mass, the total amount of slag produced was 338 kg/t, which was an amount that could be processed in the operation of the steelmaking electric furnace.

The yield of the molten steel in the entire slag separation step and decarburization step is as high as 96.8%, and even if a low-grade iron ore was used as a raw material for solid-state direct reduced iron, molten steel could be obtained with a high yield.

(Test 2)

In Test 2, since oxygen was supplied at constant flow rate from the start of heating of the steelmaking electric furnace to the end of decarburization, the average FeO content of the slag from the start of heating of the steelmaking electric furnace to the end of decarburization was as high as 25.0% by mass. Therefore, the total amount of the slag produced was as large as 456 kg/t, which was difficult to process in view of the operation of the steelmaking electric furnace. In addition, the yield of the molten steel was as low as 91.9% because a large amount of iron was discharged together with the slag.

(Test 3)

In Test 3, a high-grade iron ore was used as a raw material for solid-state direct reduced iron, so the amount of slag produced was as small as 104 kg/t. Therefore, although the average FeO content of slag from the start of heating of the steelmaking electric furnace to the end of decarburization was as high as 25.0% by mass, the iron content discharged with the slag was small and the yield of the molten steel was 98.0%, which was higher than that of Test 1. In addition, the amount of slag produced was an amount that did not cause any operational problems.

SUMMARY

As described above, according to the method for producing a molten steel according to the present invention, it was confirmed that even if a low-grade iron ore was used, molten steel could be obtained with a high yield equivalent to that when a high-grade iron ore was used.

This application is based on Japanese Patent Application Serial No. 2019-234093 filed in Japan Patent Office on Dec. 25, 2019, the contents of which are hereby incorporated by reference.

To describe the present invention, the invention was described in the foregoing description appropriately and sufficiently using embodiments with reference to specific examples and the like. However, it is to be understood that changes and/or modifications to the foregoing embodiments will readily occur to those skilled in the art. Therefore, unless a change or modification made by those skilled in the art is beyond the scope of the appended claims, such change or modification is to be embraced within the scope of the appended claims.

INDUSTRIAL APPLICABILITY

The present invention has a wide range of industrial applicability in the technical field related to a method for producing a molten steel.

The invention claimed is:

1. A method for producing a molten steel using a solid-state direct reduced iron as a raw material,
the method comprising:
a slag separation comprising heating and melting the solid-state direct reduced iron in an electric furnace without introducing oxygen to separate into a molten steel and a slag, and continuously discharging the slag from the electric furnace; and
a decarburization comprising blowing, in the electric furnace, a total amount of oxygen introduced into the electric furnace to the molten steel to decarburize after the slag separation,
wherein the decarburization is started when 50% to 80% of a total time for performing the slag separation and the decarburization has elapsed from a start of the slag separation,
wherein the solid-state direct reduced iron comprises 3.0% by mass or more of SiO$_2$ and Al$_2$O$_3$ in total and 1.0% by mass or more of carbon,
wherein a ratio of a metallic iron to a total iron content comprised in the solid-state direct reduced iron is 90% by mass or more, and
wherein an excess carbon content Cx specified by formula (1) to the carbon comprised in the solid-state direct reduced iron is 0.2% by mass or more:

$$Cx=[C]-[FeO]\times 12\div(55.85+16)\div 0.947 \qquad (1)$$

wherein, in the formula (1),
Cx is excess carbon content in mass %, [C] is carbon content of solid-state direct reduced iron in mass %, and [FeO] is FeO content of solid-state direct reduced iron in mass %.

2. The method of claim 1, wherein a basicity of the slag is set to 1.4 to 2.0 in the slag separation, and a temperature of the molten steel is set to 1500 to 1650° C. in the decarburization.

3. The method of claim 1, wherein, in the slag separation, the slag has a basicity in a range of from 1.4 to 2.0.

4. The method of claim 1, wherein, in the decarburization, the molten steel is brought to a temperature in a range of from 1500 to 1650° C.

5. The method of claim 1, wherein the ratio of the metallic iron to the total iron content contained in the solid-state direct reduced iron is 92% by mass or more.

6. The method of claim 1, wherein the ratio of the metallic iron to the total iron content contained in the solid-state direct reduced iron is in a range of from 90 to 98% by mass.

7. The method of claim 1, wherein the ratio of the metallic iron to the total iron content contained in the solid-state direct reduced iron is in a range of from 92 to 97% by mass.

\* \* \* \* \*